United States Patent
Harrelson

(10) Patent No.: US 12,519,699 B1
(45) Date of Patent: Jan. 6, 2026

(54) TIME-BASED COMPUTER NETWORK TOPOLOGY FOR NETWORK SECURITY

(71) Applicant: Cyberspatial Inc., Claymont, DE (US)

(72) Inventor: Grant Harrelson, Rockville, MD (US)

(73) Assignee: Cyberspatial Inc., Claymont, DE (US)

(*) Notice: Subject to any disclaimer, the term of this patent is extended or adjusted under 35 U.S.C. 154(b) by 56 days.

(21) Appl. No.: 18/670,278

(22) Filed: May 21, 2024

(51) Int. Cl.
*H04L 41/12* (2022.01)
*H04L 41/082* (2022.01)
*H04L 41/22* (2022.01)

(52) U.S. Cl.
CPC ............ *H04L 41/12* (2013.01); *H04L 41/082* (2013.01); *H04L 41/22* (2013.01)

(58) Field of Classification Search
CPC ....... H04L 41/12; H04L 41/082; H04L 41/22; H04L 41/0604; H04L 41/0631; H04L 41/16
USPC ........................................................ 709/220
See application file for complete search history.

(56) References Cited

U.S. PATENT DOCUMENTS

| | | | |
|---|---|---|---|
| 7,650,349 B2 | 1/2010 | Yeh | |
| 11,296,948 B2* | 4/2022 | Li | H04L 43/0811 |
| 2013/0179636 A1* | 7/2013 | Shirasu | G06F 3/0649 |
| | | | 711/E12.016 |
| 2018/0024901 A1 | 1/2018 | Tankersley | |
| 2018/0316594 A1* | 11/2018 | Wu | H04L 45/64 |
| 2020/0073871 A1 | 3/2020 | Drivflaadt | |
| 2023/0152788 A1 | 5/2023 | Wolfe | |
| 2024/0259274 A1* | 8/2024 | de Lescure | G06F 15/7825 |

FOREIGN PATENT DOCUMENTS

CN 113656407 A 11/2021

OTHER PUBLICATIONS

International Search Report and Written Opinion issued in App. No. PCT/US2025/029686, dated Sep. 4, 2025, 6 pages.

* cited by examiner

*Primary Examiner* — Jude Jean Gilles
(74) *Attorney, Agent, or Firm* — AMSEL IP LAW PLLC; Jason Amsel

(57) ABSTRACT

Time-based computer network topology for network security is described. Network metadata is extracted from raw network data from one or more collection points on a network to form structured metadata. A network database is updated with the structured metadata. A network topology update is generated that is associated with a first time period based in part on the structured metadata and a prior network topology update. The network topology update is correlated with the structured metadata to generate network history update. The network history update is recorded in the network database to form a complete network history. A visualization is generated of a time-based computer network topology of the network for a target time within a range of time (including the first time period) using the complete network history. The visualization is provided to an administrative client.

20 Claims, 8 Drawing Sheets

TIME-BASED COMPUTER NETWORK TOPOLOGY FOR NETWORK SECURITY

FIELD OF THE INVENTION

This disclosure relates generally to network security, and more specifically to generating a time-based computer network topology for network security.

DESCRIPTION OF RELATED ART

Network security, operations, intelligence, and other related tasks depends on an understanding of highly complex network environments. Such networks may contain significant numbers of physical and/or virtual computer assets of varying types and functions, may have complex and dynamically changing topologies defining connections between assets over time, and may operate with high rates of events of varying types. In view of these complexities, there is a significant challenge in discovery, monitoring, management, analysis, and visualization of networked environments and associated security assessments.

A potential solution to the above is to create a "digital twin" of the network, consisting of a time-based computer network topology, which could enable operational visibility of the network, and thereby provide complete situational awareness and understanding of its systems and behavior. However, conventional systems generally fail at creating digital twins of networks (in particular, for large networks) from their source data. For example, large volumes of network data, overlap and duplication of information in network data, sparse and/or noisy network data, multiple protocols, multiple data types, multi-layer networks, differentiation of device roles, etc., are just some of the considerations as to why conventional systems generally fail in creating a digital twin of a network.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

A security system for a networked computer environment monitors network assets and events and generates a user interface that provides a time-based visualization of the network state. To determine the time-based computer topology for a network, the security system collects raw network data from one or more collection points on the network. The security system extracts network metadata from the raw network data to form structured metadata. The security system may update a network database with the structured metadata. The security system may generate a network topology update associated with a time period based in part on the structured metadata and a prior network topology update. The security system correlates the network topology update with the structured metadata to generate a network history update. The security system records the network history update to the network database to form a complete network history (includes multiple network history updates that correspond to different times). The security system may determine a time-based computer network topology of the network using the complete network history.

The time-based visualization of a time-based computer topology of the network may be created using some or all of the complete network history. The user interface may include at least a multi-dimensional timeline panel and a computer network visualization panel that synchronously update based on changing network state, detected events, and user interactions. The multi-dimensional timeline panel independently depicts multiple categories of events according to timing of their occurrences. The computer network visualization panel depicts the network state at a selected timepoint (e.g., a target time) as a visualization showing detected network assets and connections between them.

Figure 1:
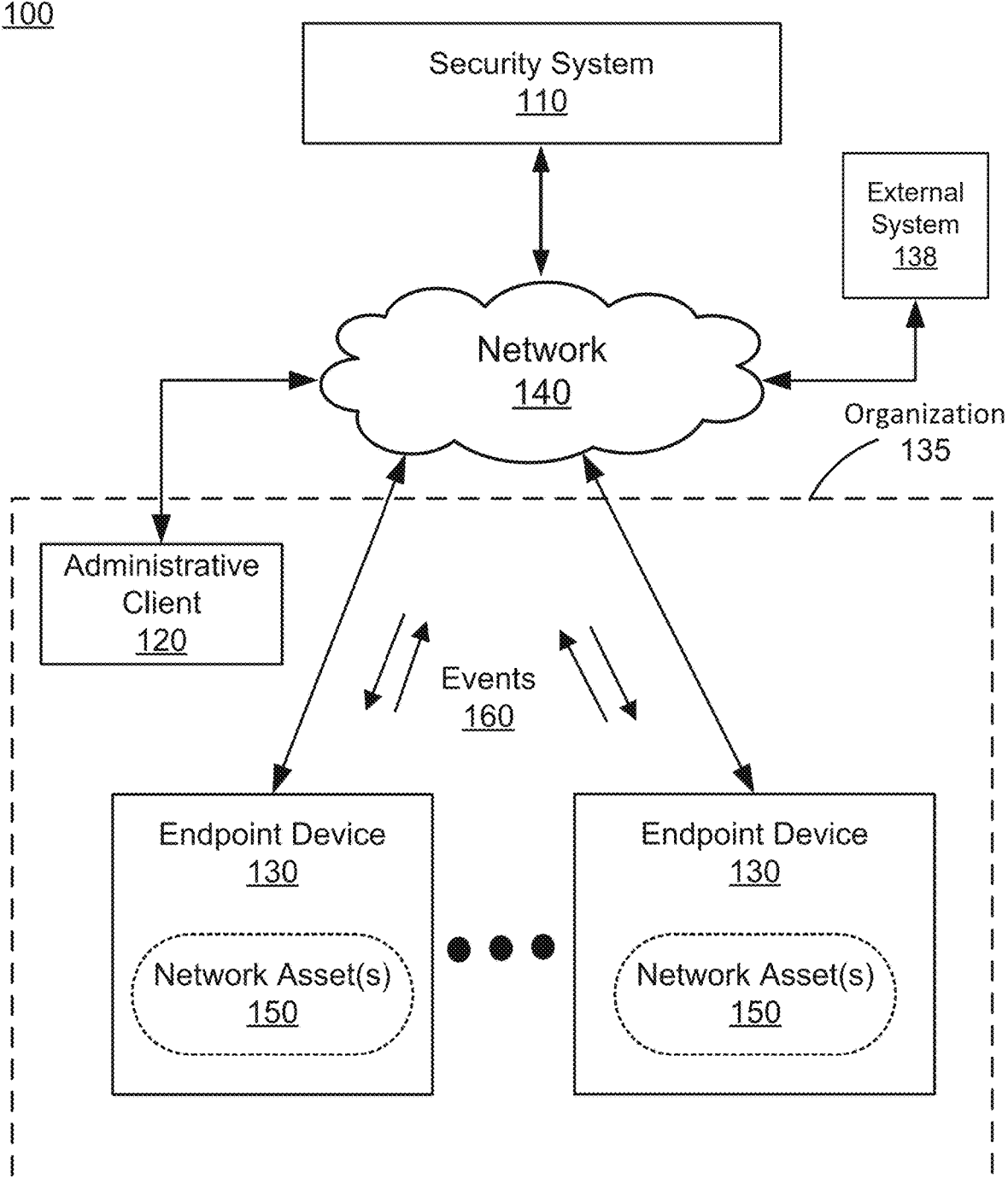
FIG. 1 illustrates a networked computing environment, in accordance with one or more embodiments.

FIG. 1 illustrates a networked computing environment 100, in accordance with one or more embodiments. The networked computing environment 100 includes a security system 110, an administrative client 120, and a set of endpoint devices 130 coupled by a network 140. In some embodiments the networked computing environment 100 may also include an external system 138 coupled by the network 140. The administrative client 120 and the set of endpoint devices 130 are part of an organization 135. Alternative embodiments may include more, fewer, or different components from those illustrated in FIG. 1, and the functionality of each component may be divided between the components differently from the description below. As such, there may be more than one organization 135, external system 138, network 140, etc. Additionally, each component may perform their respective functionalities in response to a request from a human, or automatically without human intervention.

The organization 135 is a collection of one or more devices that are part of a common structure. The structure may be, e.g., a business, a government group/department, military unit, enterprise, etc. The organization 135 includes the endpoint devices 130, and the administrative client 120. In some embodiments, there may not be an administrative client 120, and the functionality of the administrative client 120 is performed by an endpoint device 130.

The endpoint devices 130 may comprise network-enabled electronic devices coupled to the network 140. The endpoint devices 130 may include, for example, desktop computers, laptop computers, printers, entertainment devices, cameras, mobile devices, tablets, game consoles, Internet of Things (IoT) devices, servers, storage devices, logic controllers, sensors, or network infrastructure devices such as firewalls, routers, switches, load balancers, or access points. The endpoint devices 130 support various network assets 150 associated with the organization 135. Asset data is information describing one or more network assets 150. The network assets 150 may include the endpoint devices 130 themselves and/or various virtual elements capable of being monitored by the security system 110. Examples of network assets 150 may include, for example, network-enabled devices, virtual machines, containers, serverless functions, Application Programming Interfaces (API), Software-as-a-Service (SaaS) applications, software processes, network interfaces, domain names, file objects, configuration files, users, or groups. Some types of network assets 150, such as virtual machines and containers, may to some extent mimic operation of physical devices and may enable operations similar to physical endpoint devices 130. Other network assets 150, such as software processes and configuration files, may represent a specific set of data or executable instructions stored to an endpoint device 130. In distributed computing architectures, data or instructions associated with a single network asset 150 may be distributed between multiple physical endpoint devices 130. The set of network assets 150 on the network 140 may dynamically change over time. For example, different physical devices may be connected or disconnected from the network 140, virtual machines and/or containers may be instantiated or shut down, and various other elements may be created or deleted from storage.

One or more network assets 150 may be associated with events 160 comprising discrete operations or sequences of operations associated with the network assets 150. Events 160 are described by event data that can represent various information such as, for example, network flow information, network packet information, authentication information, user information, system information, application information, cloud information, security information, physical activities information, social activities information, computer-generated report and incidents, security alerts, or digital documentation and stories. The various information may be obtained or inferred from different data sources in the form of event logs associated with the different types of information or as real-time event data streams. Examples of physical activities may include events associated with industrial control systems, machinery, medical devices, or equipment, events registered by security cameras, badge readers, or other sensors, or various physical events impacting data and systems of the computer network such fire, damage, loss of connectivity, loss of power, purchase, repairs, replacement, facility construction, etc. Social activities in this context may include, for example, activities taken by users of the computer network (e.g., bringing a device home), actions pertaining to users of the computer network (e.g., employee hired or fired, granted access or revoked access, login or logout), actions involving users of the computer network (e.g., team meetings, vacations, calendar events).

Events 160 may be defined by one or more data dimensions that each represent a different attribute associated with the event 160. Data dimensions may include, for example, a time and history of the event 160, relationships and connections with other events 160, subject and participants, location and place, human knowledge, social, logical, physical, and digital information, or parameters such as frequency, proximity, repetition, position, size, intensity, etc. Events 160 may furthermore be indicative of changes to the network assets 150 (e.g., network assets 150 coming online or going offline, connections being established or relinquished, etc.). Events 160 may occur internally to the network assets 150 and do not necessarily involve information exchange between the network assets 150.

The external system 138 is composed of one or more devices that are external to the organization 135. The external system 138 may be, e.g., a device attempting to gain illegal and/or unauthorized access to the organization 135. The external system 138 can be, e.g., a server, a personal or mobile computing device (e.g., a smartphone, a tablet, a laptop computer, or desktop computer), or some combination thereof.

The security system 110 collects raw network data from the network 140 via one or more collection points. Note that raw network data collected from one collection point may offer a different perspective than raw network data taken from another collection point. For example, a packet traversing one device may contain different metadata, identifiers, timestamps, etc. if traversing some other device. The raw network data includes information describing the events 160, the endpoint devices 130, the network assets 150, and other devices that have coupled to the organization 135 via the network 140 without authorization (e.g., the external system 138).

The security system 110 extracts network metadata from raw network data to form structured metadata that corresponds to different time periods. The security system 110 updates a network database with the structured metadata, and in some embodiments, the raw network data as well.

The security system 110 may generate one or more network topology updates based in part on the structured metadata and a previously generated network topology update (e.g., from a graph database), where each network topology update is associated with a different time period. The security system 110 may generate the one or more network topology updates using models, the structured metadata, and a graph database. A network topology update describes a computer network topology of the network over a time period (e.g., for 20 minutes), and may occur periodically (e.g., every minute) or iteratively (e.g. every event data increment). In some embodiments, the network topology update includes information describing an entire computer network topology of the time period (T). In other embodiments, the network topology update describes differences between the computer network topology at T and a previously computed computer network topology associated with a time period of T−1 (e.g., prior network topology update).

The security system 110 correlates the network topology update with the structured metadata to generate a network history update. The security system 110 records the network history update in the network database to form a complete network history of the network. As this process is repeated for multiple time periods, the complete network history holds network topology updates and corresponding structured metadata for multiple time periods.

The security system 110 generates visualization(s) of a time-based computer network topology for target times within a range of time using some or all of the complete network history. A time-based computer network topology describes topologies, events, and assets of the network 140 over a range of time. The time-based computer network topology provides a way for an administrator to query asset data of the network 140, event data of the network 140, and a topology of the network 140 as a function of time, thereby providing a digital twin of the network 140.

The security system 110 facilitates visualizations of the network assets 150 and events 160 on the network 140 using the time-based computer network topology of the network. The visualizations may be for network analysis, monitoring, planning, management, troubleshooting, validation, incident response, forensics, decision-making, or other related operations associated with applications such as network security, network operations, network analysis, network intelligence, or some combination thereof. For example, the security system 110 may model and predict the behaviors of endpoint devices 130, may identify and track which network assets 150 are present on the network 140, may detect attributes of the various network assets 150, and may monitor events 160 associated with operations of the network assets 150. The security system 110 may perform various aggregation, filtering, or other processing of monitored data and generate an administrative user interface for viewing and interacting with various security or operations-related information. As will be described in further detail herein, the administrative user interface may employ various visualizations of the network assets 150 and events 160 according to a time-based approach using the time-based computer network topology. In this time-based approach, a network administrator can view events 160 and changes to network assets 150 according to their relative timing using an intuitive visual interface that enables various customized views. The presentation allows for efficient recognition of event patterns that may be indicative of anomalous or malicious activities, which in turn enable rapid remediation of vulnerabilities. The time-based visualizations may illustrate the changing network state in real-time as it occurs and may enable playback of historical recorded event sequences for enhanced analysis, auditing, and review. Some embodiments of user interfaces are described in further detail below with regard to FIGS. 4-6.

The security system 110 may execute remotely from the network 140 associated with the endpoint devices 130. For example, the endpoint devices 130 may be coupled via one or more local area networks (LANs) and the security system 110 may operate outside of the one or more LANs (e.g., in a cloud computing environment). For example, an enterprise associated with a network 140 and set of endpoint devices 130 associated with network assets 150 may collect information relating to the network assets 150 and events 160 on an enterprise network (manually or via automated sensors), and upload the information to a remote security system 110 that does not have direct access to the enterprise network. In other embodiments (e.g., in government environments or other environments handling sensitive data), the security system 110 may execute on the same network 140 as the endpoint devices 130 such that data relating to the network assets 150 and events 160 does not pass through the Internet or other network infrastructure outside the control of the enterprise.

The administrative client 120 comprises a computing device that may be operated by an administrator managing the security system 110. The administrative client 120 may enable access to the user interface described herein (e.g., via an installed application or via a web browser) for viewing information about network assets 150 and events 160, configuring security settings, or performing other administrative tasks. The administrative client 120 may enable an administrator to execute various remedial actions associated with patterns of events indicative of malicious activity. In some embodiments, the administrative client 120 may be part of an endpoint device 130.

The network 140 provides communication pathways between the security system 110, the administrative client 120, and the endpoint devices 130. The network 140 is a collection of computing devices that communicate via wired or wireless connections. The network 140 may include one or more local area networks (LANs); one or more wide area networks (WANs); one or more personal area networks (PANs); some other one or more networks that provide communication pathways between the security system 110, the administrative client 120, and the endpoint devices 130; or some combination thereof. The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as multi-protocol label switching (MPLS) lines, fiber optic cables, cellular connections (e.g., 3G, 4G, or 5G spectra), or satellites. The one or more networks 140 also may use networking protocols, such as transmission control protocol/internet protocol (TCP/IP), hypertext transfer protocol (HTTP), secure shell protocol (SSH), short message/messaging service (SMS), file transfer protocol (FTP), or virtual private networks (VPN) to transmit data between computing devices. In some embodiments, the network 140 may include Bluetooth or near-field communication (NFC) technologies or protocols for local communications between computing devices. The network 140 may transmit encrypted or unencrypted data.

Figure 2:
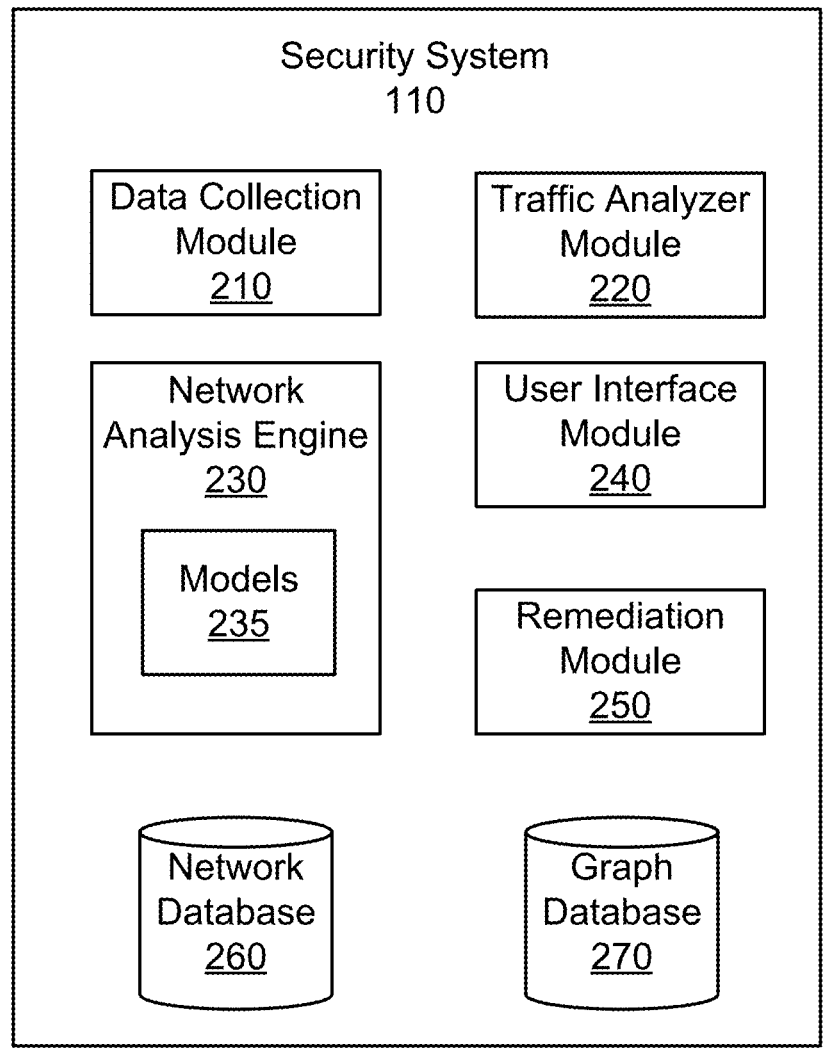
FIG. 2 is a block diagram illustrating a security system, in accordance with one or more embodiments.

FIG. 2 is a block diagram illustrating a security system 110, in accordance with one or more embodiments. The security system 110 includes a data collection module 210, a traffic analyzer module 220, a network analysis engine 230, a user interface module 240, a remediation module 250, a network database 260, and a graph database 270. Alternative embodiments may include more, fewer, or different components from those illustrated in FIG. 2, and the functionality of each component may be divided between the components differently from the description below. For example, in some embodiments, the network database 260 also performs the functionality of the graph database 270, and there is not a separate graph database.

The data collection module 210 facilitates collection of raw network data that is indicative of network assets 150 and occurrences of events 160 in one or more monitored networks of the networked computing environment 100. The data collection module 210 may facilitate collection of the raw network data from one or more collection points. And one or more different techniques may be employed to facilitate raw network data collection. In one embodiment, the data collection module 210 obtains an application programming interface (API) key that enables access to information about network assets 150 and events 160 either directly from the network assets 150 or via a third-party service. Examples of raw network data that can be collected in this manner (e.g., from a cloud service provider) include, for example, information about users, groups, and permissions, information about services, endpoints, network devices, containers, virtual machines, serverless functions, and cloud objects, or various information flow logs. Other information may be obtained via API connections to one or more information technology and/or security products that manage network assets 150 and monitor events 160 such as logs, alerts, events, configuration and settings, and/or asset information.

In another embodiment, raw network data may include asset and event data that may be obtained from one or more agents that execute locally on the endpoint devices 130. An agent may comprise a lightweight utility application that may run native operating system level commands, organize the data into a structured format, and send the data to the data collection module 202 on a one-time or recurrent basis. Examples of raw network data that can be collected using this technique include, for example, configuration files, device and system information, networking information (connections, listening ports, settings), device logs, information about user, groups settings, and permissions, and information about installed application, running processes, and resource usage (e.g., CPU usage, memory usage, disk usage, etc.)

In an embodiment, the data collection module 210 may employ a sensor collection technique in which a sensor connected to a network tap or port mirror reads raw network data (e.g., network traffic) as it passes through a router, firewall, switch or other networking device of the network 180 and writes a copy of the raw network data as a capture file uploaded to the data collection module 202. Examples of data that can be captured using this technique may include network traffic, network logs, and network flow data.

In yet another embodiment, the data collection module 210 may employ a manual collection technique in which a user facilitates gathering of logs, configuration files, and device artifacts from existing data storage locations (e.g., a backup file server or logging server) and manually initiates a process to upload the data to an upload portal of the data collection module 210. Examples of raw network data that may be collected using his technique include, for example, any of the machine-generated data listed above or human-generated data such as security policies, documentation, architecture diagrams, and spreadsheets.

In an embodiment, the data collection module 210 may employ a combination of any of the above techniques and/or other data collection techniques.

The traffic analyzer module 220 extracts network metadata from the raw network data to form structured metadata that is associated with a range of time. The traffic analyzer module 220 may, e.g., obtain event data and/or asset data from the data collection module 210 and process the data to generate structured metadata. For example, the traffic analyzer module 220 may extract for some or all of the raw data, such as internet protocol (IP) addresses, medium access control (MAC) addresses, virtual local area networks (VLANs), ports, protocols, protocol attributes, flow direction from the raw data, et cetera, or some combination thereof. The traffic analyzer module 220 may normalize the extracted data from varying disparate formats depending on the data source to a standardized format. The traffic analyzer module 220 may furthermore perform various filtering and aggregation operations. The traffic analyzer module 220 stores the raw network data and the structured metadata in the network database 260 (e.g., a relational database).

Note that raw network data collected from one collection point may offer a different perspective than raw network data taken from another collection point. Moreover, conventional, security systems won't look at the entirety of the network data. Instead they pre-filter, strip, and trim and use only the most obvious parts for performance reasons. This means that conventional systems can only look at relationships within metadata that they did parse out for inferring the network topology. In contrast, the traffic analyzer module 220 may identify and parse a large volume of protocols and applications, fully parsing everything and unwrapping everything layer by layer to examine and performing deeper analysis. This can assist the network analysis engine 230 create a richer map of the network and discover the many layers of a modern network topology.

The traffic analyzer module 220 may decode, parse, and session-ize raw network data packets into higher-order, meaningful structured metadata. The traffic analyzer module 220 may uses a combination of rule-based, statistical, and machine-learning methods to identify unencrypted and encrypted protocols and applications (e.g. Signal Messenger), which otherwise would show up as generic or random data.

The network analysis engine 230 generates network topology updates based in part on the structured metadata. In some embodiments, the network analysis engine 230 may correlate, deduplicate, normalize, and deconflict the structured metadata prior to generating a network topology update. In some embodiments, the network analysis engine 230 may in addition to the structured metadata use information from the graph database 270 to generate a network topology update. A network topology update describes a computer network topology of the monitored network for a time period (e.g., an hour). The network analysis engine 230 may retrieve structured metadata for the time period from the network database 260. For example, if the time period is an hour and the current time is 11:30 am, the network analysis engine 230 may retrieve structured metadata that is associated with a most recently completed hour (e.g., from 10:00 am to 11:00 am) from the network database 260, and use the structured metadata to determine a network topology update for the last complete hour. The network analysis engine 230 may retrieve structured metadata from the network database 260 on a recurring basis, an on-demand basis, or both, in incremental batches to determine network topology updates. For example, the network analysis engine 230 may retrieve the structured metadata from the network database 260 that is associated with a time period. In some embodiments, the time period may be set by an administrator of the network. In some embodiments, the network analysis engine 230 automatically determines the time period. For example, the network analysis engine 230 may determine a delta between subsequent topological updates, and if the delta is above a first threshold value, reduce the time period for the next network topology update (e.g., go from an hour to 3 min). Likewise, in some embodiments if the delta is below a second threshold value, the network analysis engine 230 may increase the time period for the next network topology update. The first threshold value may be greater than or equal to the second threshold value. In some embodiments, the network analysis engine 230 may dynamically scale the amount of change to a time period based in part on a size of the delta. For example, increasingly large deltas may be mapped to increasingly small time periods between network topology updates, or vice versa.

The network analysis engine 230 generates the topological updates using models 235 and the structured metadata. In some embodiments, the topological updates may also be based in part on one or more previously generated topological updates that are associated with a prior time period. The models 235 may include, e.g., a networking science model, a device inference model, and a time dependency model. Alternative embodiments may include more, fewer, or different models, and the functionality of one or more of the models may be divided between the components differently from the description below. For example, in some embodiments, there is not a separate time dependency model and its functionality is performed by the networking science model and the device inference model. One or more of the models 235 may be rule based, a machine learned models, or some combination thereof. In some embodiments, the models 235 may include models of different types (e.g., one rule based and another a machine learned model).

The networking science model is one of the models 235, and is configured to determine features of the monitored network. Network features describe how endpoint devices and network assets are connected and interact within the network at various levels of a multi-layer network topology. Network features may include, e.g., broadcast domains, routing domains, logical links, physical links (wired and/or wireless), network interfaces, some other information that describes how endpoint devices and network assets are connected and interact within the network, or some combination thereof. Network features may span multiple layers of the Open Systems Interconnection (OSI) networking framework (e.g., Layers 1-3 (i.e., the physical layer, the data link layer, the network layer, the transport layer, and the application layer)). The network analysis engine 230 may apply some of the structured metadata associated with a time period to the networking science model to determine network features for the time period. For example, one technique used by the networking science model gathers a unique collection of MAC address and IP address pairs and group them by the time they were first seen and last seen, and then assigns them as potential nodes on the network in concert with other network metadata seen. This can be repeated for subsequent batches of network metadata and updated against previous collections and groupings.

The device inference model is one of the models 235, and is configured to identify and characterize endpoint devices that are coupled to the monitored network. The device inference model may use one or more techniques to, e.g., discover endpoint devices on the monitored network(s), differentiate types of devices (e.g., networking device from a host device), determine specific details regarding endpoint devices (e.g., the device type, operating system, type, model, or version)), identify application services and/or other attributes associated with an endpoint device, or some combination thereof. For example, different combinations of identifiers, such as IP address, MAC address, hostnames, user agent strings, and other tokens parsed from various protocols within the network metadata allows for differentiation and identification of devices that originated them. Unique timing patterns and the destination hosts of their communications can further qualify device types, applications, operating systems, and their versions. The network analysis engine 230 may apply some of the structured metadata (e.g., timestamps associated with identifiers like IP addresses, MAC addresses, hostnames, user agent strings, and other tokens parsed from various protocols in the network data) associated with the time period to the device inference model to determine device information for the time period. Note that relationships between endpoint devices based on their application or service roles may represent high-order network topologies that span Layers 4-7 (i.e., transport layer, session layer, presentation layer, and application layer) of the OSI networking framework.

The time dependency model is one of the models 235, and is configured to generate time-based inferences using model inputs. The model inputs may include, e.g., the network features for the time period, the device information for the time period, time-related information for the time period, and one or more previous network topology updates. In some embodiments, the model inputs may also include some of the structured metadata. A time-based inference is an inference regarding device information and/or a network feature determined over multiple time periods. The time dependency model retrieves the one or more previous network topology updates from the graph database 270. The network analysis engine 230 may apply the model inputs to the time dependency model to determine time-based inferences for the time period.

The time dependency model may use one or more techniques to identify changes in behavior of the endpoint devices over time. For example if an identifier like an IP address or user agent changes from one time period to another, this would indicate that a device on the network has changed or has been updated. The time dependency model also monitors time that has elapsed since a device last communicated to different hosts. Depending on the frequency or periodicity of these changes, the time dependency model, combined with the networking science and device inference model may determine the status of the device. A change in behavior may indicate, e.g., if an endpoint device is transient, intermittent, active, inactive, changed identifiers, etc. The change in behavior may also indicate a modification to the network features (e.g., change in network structure due to an outage, configuration change, etc.). For example, if the monitored network includes a public Wi-Fi access point, there may multiple endpoint devices that couple to it at different times using a same IP address. However, as the endpoint devices are different, their observed behavior on the network is likely different from one other. The time dependency model may analyze the behavior of an endpoint over time to generate one or more time-based inferences regarding whether the endpoint is one device or different devices.

The network analysis engine 230 uses the network features for the time period, the device information for the time period, and the time-based inferences for the time period to generate a network topology update for the time period. In some embodiments, the network analysis engine 230 generates the network topology update using just the network features for the time period, the device information for the time period, and the time-dependency information for the time period. In other embodiments, the network analysis engine 230 retrieves the prior network topology update from the graph database 270. The network analysis engine 230 then updates the prior network topology update using the network features for the time period, the device information for the time period, and the time-dependency information for the time period, to form the network topology update for the time period.

The network analysis engine 230 correlates the network topology update with the structured metadata to generate a network history update. The network analysis engine 230 records the network history update in the network database 260 to form a complete network history of the network. As this process is repeated for multiple time periods, the complete network history holds network history updates (e.g., network topology updates and corresponding structured metadata) for multiple time periods.

The user interface module 240 generates visualizations of a time-based computer network topology of the network using some or all of the complete network history. The time-based computer network topology describes topologies, events, and assets of the network over a range of time that includes the time period. The time-based computer network topology is a data construct that can be queried as a function of time to show a state (e.g., topology, connections, event data, network changes, etc.) of the network at that time. The user interface module 240 may access information (e.g., topology of the network at a particular time) in the complete network history to generate the time-based computer network topology. The user interface module 240 may provide the time-based visualizations to the administrative client 120 for presentation (e.g., via a browser). Examples of such visualizations are discussed in further detail below with regard to, e.g., FIGS. 4-6. The user interface module 240 may further obtain and process user interactions from the administrative client 120 and update the user interface in response to the interactions. For example, the user interface module 240 may execute various analytics, queries, and filters to generate the various visualizations as further described below.

Note in some embodiments, an administrator, accessing the user interface module 240 vi the administrative client 120, may manually make a change to a visualization that can affect the time-based computer network topology. For example, the administrator may change a type of endpoint device represented in a visualization associated with a particular time period. The user interface module 240 may update the time-based computer network topology to reflect the change for the time period. The change may then be backpropagated to the network database 260 and the graph database 270 for that the time period.

The user interface module 240 may furthermore enable detection of patterns indicative of anomalous or malicious activity and may generate alerts responsive to such detection. The user interface module 240 may furthermore enable the administrator to initiate a remedial action in response to detection.

The user interface module 240 may furthermore enable users to create additional events from existing events in the timeline as reports and stories. For example, users can select a set of events indicative of a pattern of interest (e.g., indicative of anomalous or malicious activity) and use the user interface to create a time-stamped stories and/or report associated with the pattern as an additional user-created event 160. The user interface module 240 may furthermore enable users to generate and export screenshots, summary reports, and detailed asset or event data for collaborative analysis in $3^{rd}$ party software. Data may be exportable in various format such as images, slides, spreadsheets, or various document formats.

The remediation module 250 includes various remediation tools for remediating detected malicious activity. For example, the remediation module 308 may include various access blocking tools, network configuration tools, data recovery tools, malware removal tools, disk image restoration tools, etc. that may be applied to enable recovery from anomalous or malicious activity. Remediation may involve, for example, containment from the network, blocking code or script execution, blocking access to an IP address, port, or domain, removing a malicious application or service, revoking user permissions, recovering lost data, gathering additional security artifacts for investigation, shutting down or restarting the system, applying patch updates or new configurations, installing additional software, executing cleanup scripts, changing system settings, etc.

In an embodiment, the remediation module 250 may include an interface for integrating with one or more external security applications (which may be operated by third-parties) to perform various remediation tasks. Here, a remediation request may be manually triggered via a control interface of the user interface or may be automatically triggered based on a triggering rule. The triggering rule may be defined by a user-definable rule set that causes a remediation action to trigger in response to one or more conditions being observed. The external security application may then employ one or more of the remediation techniques described above, or other remediation techniques specific to the security application.

The network database 260 is a datastore designed to hold data used by the security system 110 for network security monitoring. For example, the network database 260 stores, for one or more networks: raw network data, structured metadata, network topology updates, network history updates, and complete network histories. The network database 260 may be updated and/or queried by other modules in the security system 110. In some embodiments, the network database 260 is a relational database.

The graph database 270 is a datastore designed to hold network topology updates associated data for one or more networks. For example, for a given network, the graph database 270 may store a plurality of network topology updates for the network that are associated with different time periods. The graph database 270 may be updated and/or queried by other modules in the security system 110 (e.g., the network analysis engine 230).

In the illustrated embodiment there is a single network database 260 and a single graph database 270. In other embodiments, there may be a single database that includes the functionality of both the network database 260 and the graph database 270. In another embodiment, there may be a plurality of network databases and/or graph databases. For example, each monitored network may have its own network database and/or graph database.

Note that the time-based computer network topology is effectively a digital twin of the network. And the security system 110 is able to account for large volumes of network data, overlap and duplication of information in network data, sparse and/or noisy network data, multiple protocols, multiple data types, multi-layer networks, differentiation of device roles, etc., in generating and updating the time-based computer network topology. A such, the time-based computer network topology may be used to, e.g., provide live operational visibility of a network, provide complete situational awareness and understanding of endpoint devices (and their behavior) on the network.

Figure 3A:
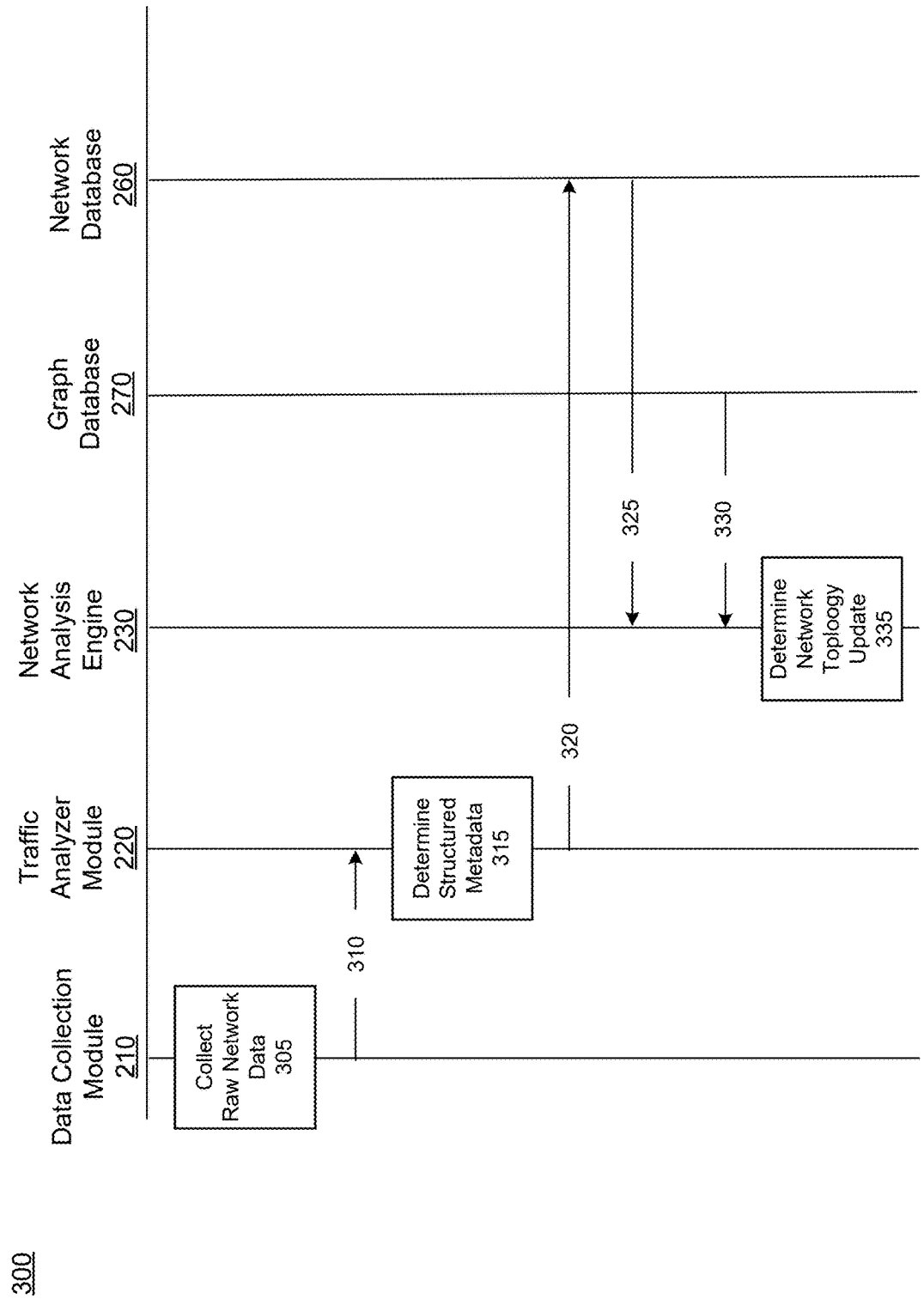
FIGS. 3A-B describe an example sequence diagram describing generation and presentation of a time-based computer network topology, in accordance with one or more embodiments.
Figure 3B:
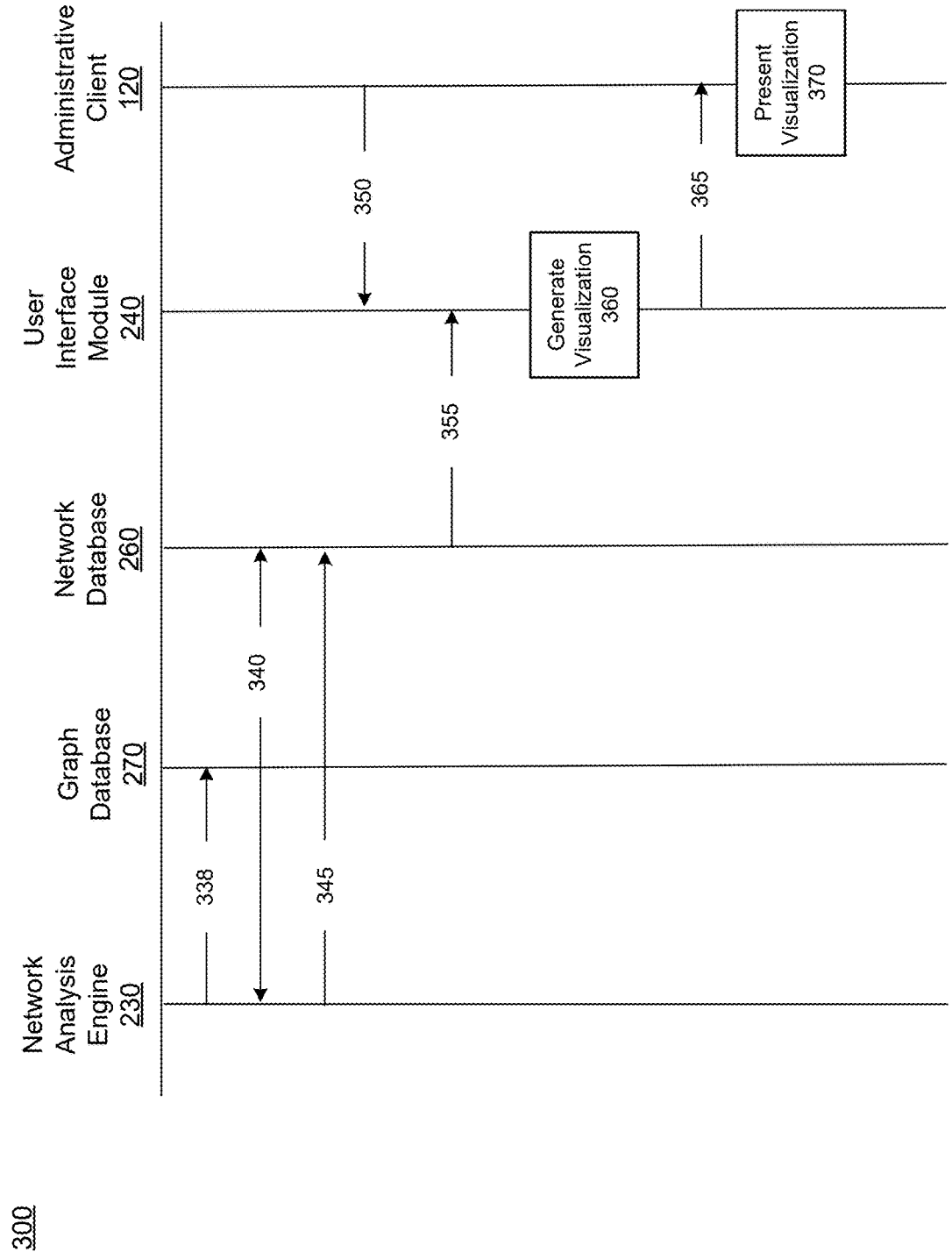

FIGS. 3A-B describe an example sequence diagram 300 describing generation and presentation of a time-based computer network topology, in accordance with one or more embodiments. Alternative embodiments may include more, fewer, or different interactions from those illustrated in FIGS. 3A-B, and the steps may be performed in a different order from that illustrated in FIGS. 3A-B.

The data collection module 210 collects 305 network data from one or more collection points on a network. For example, the data collection module 210 may use API keys (that enable access to information about assets and events either directly from the assets or via a third-party service), one or more agents that execute locally on the endpoint devices, a sensor collection technique, a manual collection technique, or some combination thereof. Some or all of the network may be associated with an organization.

The data collection module 210 provides 310 the raw network data to the traffic analyzer module 220.

The traffic analyzer module 220 extracts 315 network metadata from the raw network data to form structured metadata. The traffic analyzer module 220 may, e.g., obtain event and/or asset data from the data collection module 210 and processes the data to generate structured metadata. The traffic analyzer module 220 stores the structured metadata, and in some embodiments the raw data as well, in the network database 260.

Note that while steps 305-320 are discussed in context of a single collection event, as time progresses, steps 305-320 repeat such that the network database 260 is continually being updated with structured metadata associated with different time periods.

The network analysis engine 230 retrieves 325 structured metadata for a first time period (T) from the network database 260. For example, the network analysis engine 230 may retrieve structured metadata from the network database 260 every thirty minutes, where the data received is the most recent structured metadata stored in the network database 260. The retrieved structured metadata may include, e.g., timestamps, IP addresses, MAC addresses, VLANs, ports, protocols, protocol attributes, flow directions, etc.

The network analysis engine 230 retrieves 330 one or more prior network topology updates from the graph database 270. The one or more prior network topology updates may include the previous network topology update (e.g., for T−1).

The network analysis engine 230 determines 335 a network topology update for the first time period. The network analysis engine 230 determines the network topology update using the models 235 (e.g., a networking science model, a device inference model, and a time dependency model), the structured metadata for the first time period, a previous network topology update (e.g., for T−1) from the graph database 270.

The network analysis engine 230 applies some of the structured metadata associated with the first time period to the networking science model to determine network features (e.g., broadcast domains, routing domains, logical links, physical links (wired and/or wireless), network interfaces) for the first time period.

The network analysis engine 230 applies some of the structured metadata associated with the first time period to the device inference model to determine device information (e.g. discover endpoint devices on the monitored network(s), differentiate types of devices (e.g., networking from host), for the first time period.

The network analysis engine 230 applies model inputs (e.g., the network features for the first time period, device information for the first time period, timing-related information for the first time period, and one or more previous network topology updates) to the time dependency model to determine time-based inferences for the first time period.

Note that there may be hundreds of fields within the structured metadata. The networking science model may make heavier use of IP addresses, MAC addresses, VLANs, routing protocols, ports, and transport/tunneling protocol information than the time dependency model, which may rely more on timestamps, frequency, periodicity, delay, and statistical timing information. The device inference model may use combinations of small differences in the structured metadata such as version changes in the user agent and timing patterns of communications.

The network analysis engine 230 uses the network features for the first time period, the device information for the first time period, and the time-based inferences for the first time period to generate the network topology update for the first time period.

The network analysis engine 230 updates 338 the graph database 270 with the network topology update for the time period. In this manner, the network topology update is available for use by the network analysis engine 230 (e.g., the time dependency model) in later determinations of network topology updates.

The network analysis engine 230 correlates 340 the network topology update with the structured metadata in the network database 260 to generate a network history update. The correlation functions to associate the network features of the time period and the device information for the time period with the structured metadata for that time period in the network history.

The network analysis engine 230 records 345 the network history update in the network database 260 to form a complete network history of the network. The complete network history includes network history updates for the time period as well as for any previous time periods a network history was generated. Note that while steps 305-345 are discussed in context of the first time period, as time progresses, steps 305-345 may repeat such that the complete network history for the network is continually being updated with information for subsequent time periods.

The administrative client 120 may request 350 a security visualization from the user interface module 240 for a target time period. For example, the administrative client 120 may request, via a browser, a user interface from the user interface module 240.

The user interface module 240 retrieves 355 some or all of the complete network history from the network database 260. The user interface module 240 retrieves a portion of the complete file history that is for the target time period. In some embodiments, the user interface module 240 may additionally retrieve portions of the complete file history associated with other time periods. For example, the user interface module 240 may retrieve a portion of the complete file history that corresponds to a range of time that includes the target time period.

The user interface module 240 generates 360 a visualization, of a time-based computer network topology (TBCNT) of the network at the target time, using the retrieved portion of the complete network history and the target time period. The user interface module 240 generates the TBCNT of the network using the retrieved portion of the complete network history associated with the target period.

The user interface module 240 provides 365 the generated visualization to the administrative client 120. The administrative client 120 presents 370 the visualization. An administrator associated with the administrative client 120 may then make, e.g., a change to the network, pursue a remediation, etc. For example, an administrator, accessing the user interface module 240 via the administrative client 120, may manually make a change to the visualization associated with the target time (e.g., change a type of endpoint device represented in a visualization to be a different type). The user interface module 240 may update the time-based computer network topology to reflect the change for the time period. The change may then be backpropagated to the network database 260 and the graph database 270 for that the target time.

Figure 4:
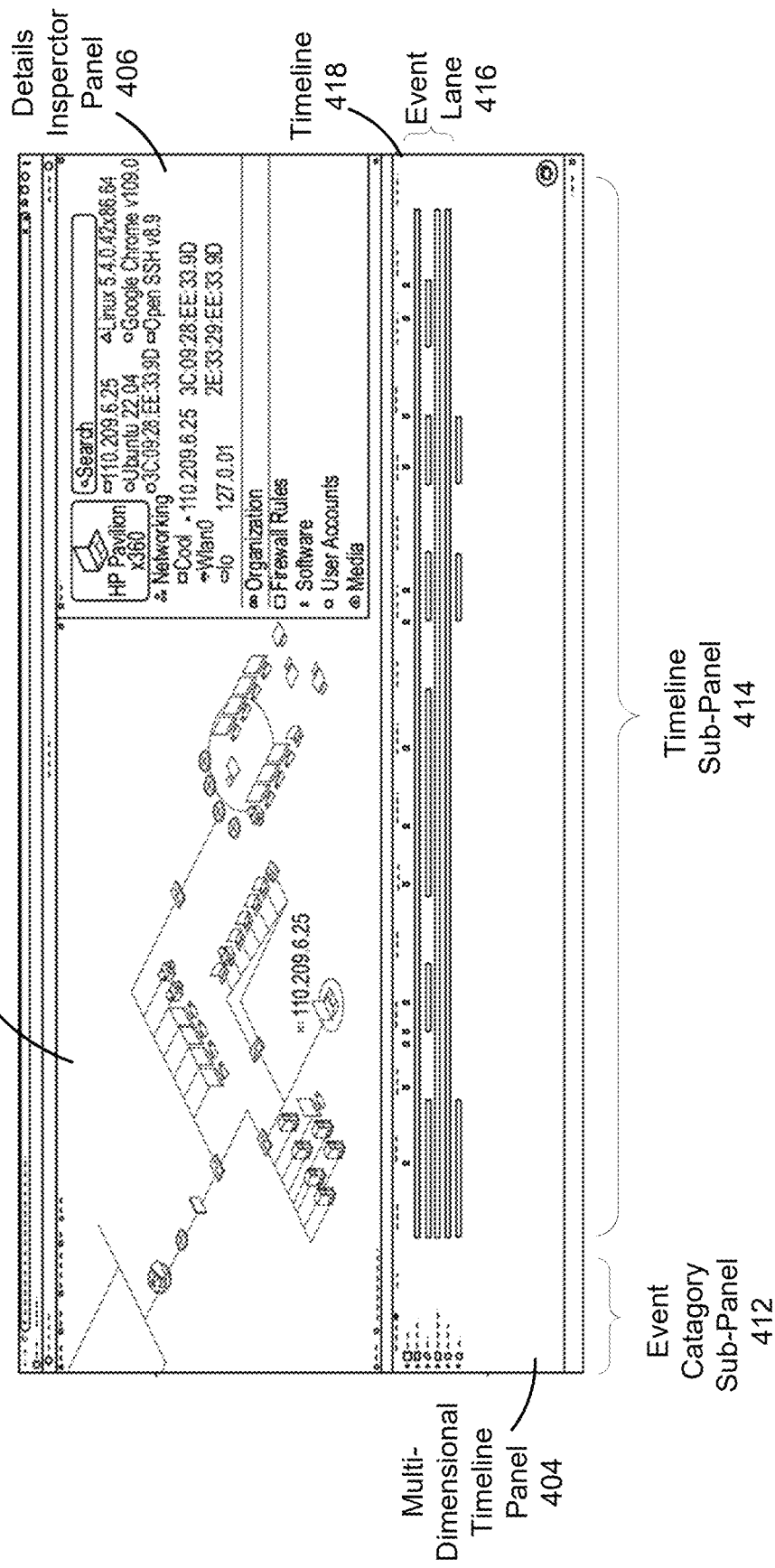
FIG. 4 illustrates an example of a user interface for providing a visualization of a time-based computer network topology.

FIG. 4 illustrates an example of a user interface 400 for providing a visualization of a time-based computer network topology. The user interface 400 may be presented to an administrator of the administrative client 120. In this example, the user interface 400 is divided into several panels (each comprising a sub-area of the interface) including a computer network visualization panel 402, a multi-dimensional timeline panel 404, and a details inspector panel 406. Each of the panels 402, 404, 406 provide different functionalities, may enable different types of interactions, and may display different visual information related to present and/or past states of the networked computing environment 100.

The multi-dimensional timeline panel 404 displays an interactive multi-dimensional timeline that visually represents time-based occurrences of network events 160 across multiple event categories. The interactive multi-dimensional timeline may be generated using the time-based computer network topology from the network database 260. Each event category may define a subset of events based on one or more filters. The event categories may be specified in an event category sub-panel 412 and the events associated with each event category may be visually represented as an event lane 416 in a timeline sub-panel 414. For example, in the illustrated example, the event categories may be filtered to represent different application types associated with data event 160 such as audio/video events, chat events, network services events, web events, and events of unknown type. In an embodiment, these categories may furthermore be expandable to show event sub-categories. In other embodiments, the event categories may be based on different configurable filters. For example, event categories may filter events based on attributes such as type of event, type of device associated with the event, specific applications associated with the event, geographic locations associated with the event, business units associated with the event, etc. Custom data categories may be set based on any filterable attributes of the events. The event categories may be exposed in a variety of views based on attributes associated with the relevant network assets 150 or events 160. For example, a default set of event categories may be based on traffic type and the relevant protocol and/or application. Other sets of event categories may be based on, for example, traffic types, destination ports, IP addresses, severity levels, domain hostnames, user personas, log type, or other asset and network identifier (e.g., vendor name or user agent string) etc.

The event lanes 416 are each indexed to a timeline 418 and include a plot of events occurrences according to their event timing. For example, the plot may include a sequence of bars or other visual indicators mapped to the timeline 418, where each bar represents an occurrence of an event 160 within the respective category. Some types of events 160 may include a start time and end time, in which case the length of the bar may be representative of the duration of the event 160. In other cases, a sequence of events 160 in close time proximity may be aggregated together into a single bar having a start time and end time indicative of the start and end of the sequence of events 160.

The different event lanes 416 may be configured to display different event occurrences according to different colors, fill patterns, shapes, annotations, effects, text, or other visual characteristics to enable a user to visually distinguish between event attributes such as event time, duration, size, severity, volume, frequency, periodicity, details, etc. Text may be provided in relation to different event occurrences to expressly describe the events and related data.

The specific visual characteristics (e.g., colors) may be automatically assigned and/or may be manually configured by the user. The visual presentation enables a user to visually see patterns of event occurrences by repetition, proximity, relatedness, density, duration, intensity, and other data dimensions. In an embodiment, multiple related events may be automatically grouped together (e.g., based on a common attribute). Here, a group icon may be indicative of the group of events and the common attribute.

The multi-dimensional timeline panel 404 may update in substantially real time as events 160 are observed. Here, the event lanes 416 may display in a scrolling window where the right edge of the display represents the current time. Thus, individual events scroll from right to left as they age. The multi-dimensional timeline panel 404 may furthermore be paused to freeze the display at a specific selected time. A replay function may enable historical events 160 to be replayed from a selected starting time. Here, the speed of the replay may be adjustable to be slower than real-time, faster than real-time, or the same as real-time.

A user may interact with the multi-dimensional timeline panel 404 in various ways. For example, a zoom-in function enables zooming into a specific period of the timeline 418 and event lanes 416 to visualize timing of events 160 during that time period in greater resolution. Similarly, a zoom-out function may zoom out to visualize the timeline 418 and associated event lanes 416 over a longer time period. A pan function enables panning through the timeline 418 and event lanes 416 to view different selected time periods at the current zoom level. The interface also enables vertical scrolling through different event categories. A repositioning function may enable the event categories and their respective event lanes 416 to be re-ordered. Furthermore, a grouping function may enable grouping or re-grouping of the different categories into category groups that may be displayed adjacent to each other in the timeline sub-panel 414. Other functions relating to the multi-dimensional timeline panel 404 are described with respect to the remaining figures.

The computer network visualization panel 402 provides a visualization of the network state at a selected time. In the illustrated example, the network state may be represented as a network topology graph including a set of network assets 150 (represented as nodes) and connections between them (represented by edges) at a selected time. The network state may be determined using the time-based computer network topology in the network database 260. Different types of network assets 150 may be visually distinguished using different icons (e.g., client devices, printers, firewalls, web servers, IoT devices, etc.). Furthermore, the layout in the computer network visualization panel 402 may reflect geographic locations associated with network assets 150. The computer network visualization panel 402 may furthermore depict network events 160 using various animations or other visual indicators.

In other examples, the network state may be represented using other types of visualizations such as charts, tables, maps, or other visualizations. For example, a chart or table may include text identifying the network assets 150 and a set of related fields indicating connections between the network assets 150 and/or other attributes. In another example, a map may plot locations of network assets 150 with respect to a geographic map or a floor plan together with other information such as connectivity and/or various attributes. The user interface may be configurable to enable multiple different types of visualizations to be displayed concurrently.

The computer network visualization panel 402 may update the network state in substantially real-time as events 160 are detected in the time-based computer network topology. The computer network visualization panel 402 may furthermore be paused to freeze the network state at a specific selected time, or may be replayed from a selected started time. The computer network visualization panel 402 may be updated synchronously with the multi-dimensional timeline panel 404 such that the computer network visualization panel 402 presents the network state associated with a corresponding selected time in the multi-dimensional timeline panel 404. The computer network visualization panel 402 may furthermore display a replayed "movie" of the network state from a selected playback time using earlier time periods in the time-based computer network topology.

Various search filters may be applied to the computer network visualization panel 402 to filter the displayed results. For example, filters may be applied to limit the network assets 150 depicted in the computer network visualization panel 402 to one or more selected asset type, asset attribute, event information, or based on other filter criteria. The filters may be synchronized with interactions in the multi-dimensional timeline panel 404. For example, selecting an event category in the multi-dimensional timeline panel 404 may filter the assets 150 in the computer network visualization panel 402 consistent with the selection (e.g., by hiding network assets 150 outside the selected category or visually highlighting network assets 150 in the selected category). Or for example, selecting events may display a corresponding visual playback or animated cue describing the event in the multi-dimensional timeline panel 404.

In an embodiment, multiple related network assets 150 may be automatically grouped together based on one or more common attribute. For example, a cluster of virtual machines serving a similar function or sharing a common attribute may be grouped together in the computer network visualization panel 402 and displayed as a single icon representing that function or attribute.

The detailed inspector panel 406 shows detailed information pertaining to one or more selected network assets 150 or connections between network assets 150 (which may be selected in the computer network visualization panel 402) or one or more events 160 (which may be selected in the multi-dimensional timeline panel 404). Types of information that may be shown about a selected network asset 150 may include, for example, a unique identifier for the network asset 150, a type of network asset 150, a network address, an operating system version, installed applications, etc. Types of information about events 160 may include, for example, an event time, an event type, one or more network assets 150 associated with the event 160, event metadata, etc.

The detailed inspector panel 406 may comprise multiple separate panels instead of a single panel. For instance, the detailed inspector panel 406 may comprise multiple sub-panels or tabs corresponding to different types of information such as project information, asset details, event details, network packet-level information, or other information types.

The detailed inspector panel 406 may be synchronized to interactions in the computer network visualization panel 402 and/or the multi-dimensional timeline panel 404. For example, a particular network asset 150 or connection may be selected in the computer network visualization panel 402 to generate an information display in the detailed inspector panel 406. Similarly, one or more events 160 may be selected in the multi-dimensional timeline panel 404 to cause the detailed inspector panel 406 to display details associated with the selected event 160. In an embodiment, a general help panel may be displayed when no network asset 150 or events 160 are selected. In other instances, the detailed inspector panel 406 may display details relating to other selectable elements that do not necessarily relate directly to the network assets 150 or events 160.

The information shown in the different panels 402, 404, 406 may be synchronized in responding to network changes and/or user interactions. For example, a multi-dimensional timeline panel 404 may be linked to a computer network visualization panel 402 such that the visualization automatically updates responsive to a selection of a timepoint in the timeline 418 to show the topology at that particular timepoint. Furthermore, selecting a network asset 150 in the computer network visualization panel 402 or an event 160 in the multi-dimensional timeline panel 404 may cause the inspector panel 406 to update to show details associated with the selected network asset 150 or event 160.

Filtering may also be performed via interactions with element in one of the panels 402, 404, 406, which may carry through to other linked panels of different type. For example, selecting one or more network assets 150 in the computer network visualization panel 402 may filter the information in the multi-dimensional timeline panel 404 to only display events 160 related to those network assets 150. Additional details may likewise be displayed in the detailed inspector panel 406. Furthermore, selecting a time period in the multi-dimensional timeline panel 404 may limit the computer network visualization panel 402 to show only network assets 150 that are present during the selected time period.

In an embodiment, a search function enables searching of network assets 150, events 160, or other data in the user interface 400. For example, a keyword search may identify elements in multi-dimensional timeline panel 404, in the computer network visualization panel 402, and or the detailed inspector panel 406 that are relevant to the query and may provide a visual indication of the identified elements (e.g., highlighting the elements, outlining the elements, animating the elements, annotating the elements, etc.).

Figure 5:
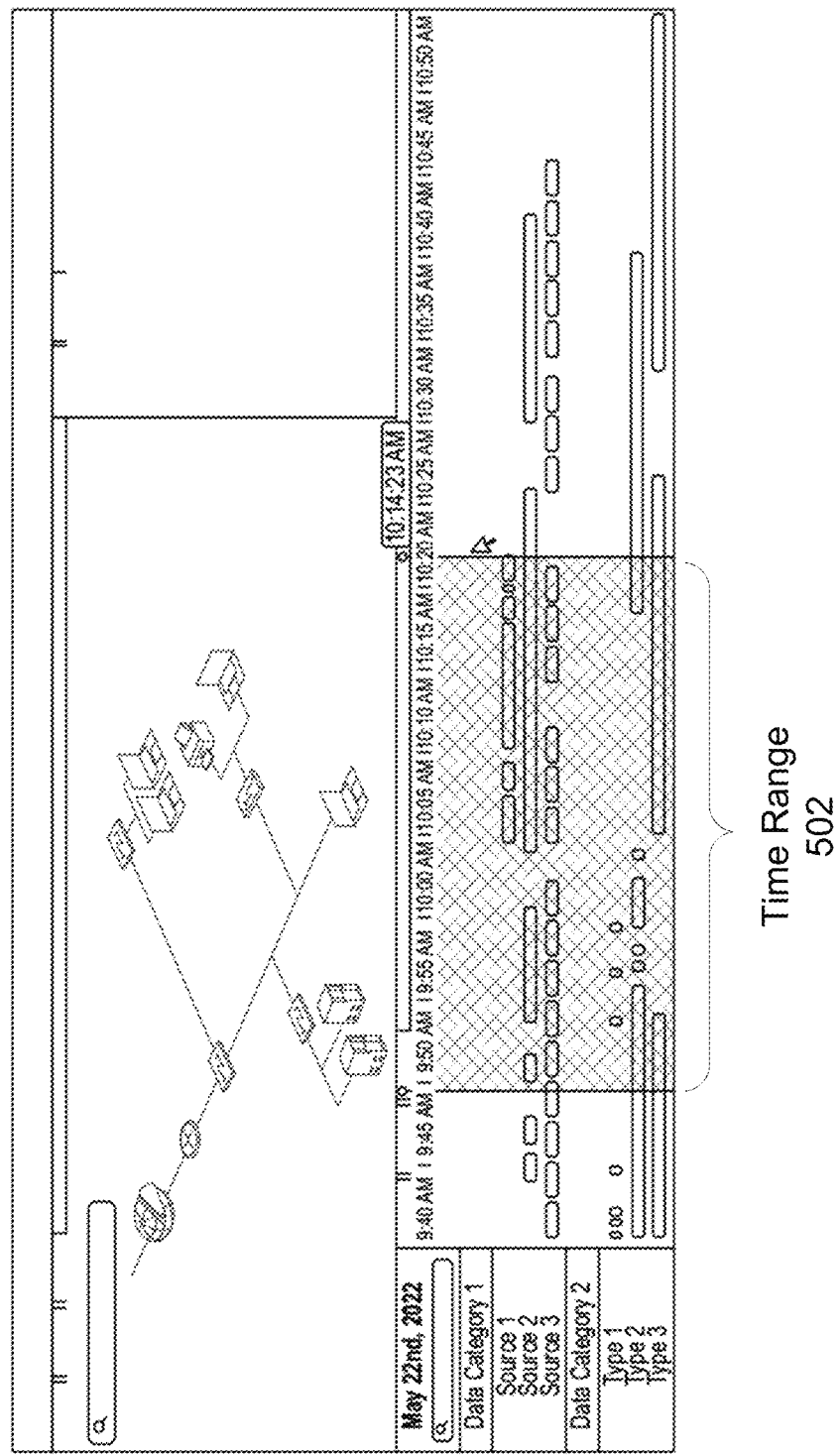
FIG. 5 illustrates an example of a comparison feature of the user interface.

FIG. 5 illustrates an example of a comparison feature of the user interface 500. Here, a time range 502 is selected between a starting time and an ending time (e.g., using starting and ending time cursors). Upon selecting the time range 502, the computer network visualization panel 302 may be updated to show a comparison view that visually distinguishes between network assets 150 and/or connections that remained the same between the start and time and end time and assets and/or connections that changed during the time range 502. In the illustrated example, network assets 150 that came online or went offline during the time range may be shown in dashed lines. In other embodiments, different visual indicators may be used to distinguish between network assets 150 that came online or went offline during the time period (e.g., using different line patterns, colors, animations, tags, annotations, etc.)

Figure 6:
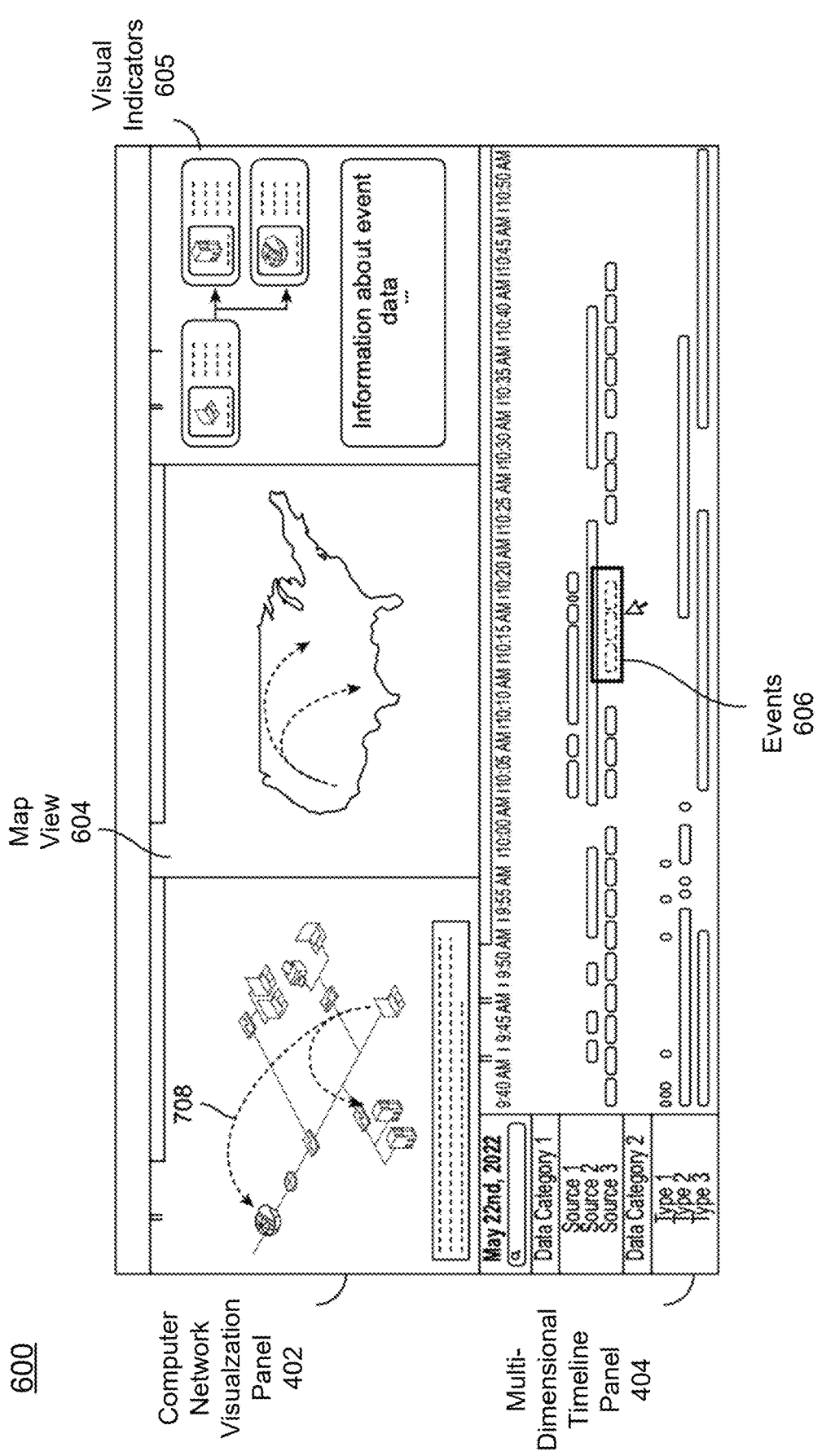
FIG. 6 illustrates an example of a selection feature in the user interface.

FIG. 6 illustrates an example of a selection feature in the user interface 600. Here, a set of events 606 are selected in the multi-dimensional timeline panel 404. In response to the selection, visual indicators 608 are displayed in the computer network visualization panel 402 to indicate the network assets 150 associated with the events. The visual indicators 608 may furthermore show a direction of communications associated with the selected events. FIG. 6 also illustrates a map view 604 that shows a visualization of the selected events 606 plotted against the geographic locations of the network assets 150 associated with the events 606. As described above, the user interface 600 may additionally or alternatively include other types of visualizations of the network state such as charts. The detailed inspector panel 406 may show additional detailed information relating to the selected events 606, the assets involved, and their various attributes.

Figure 7:
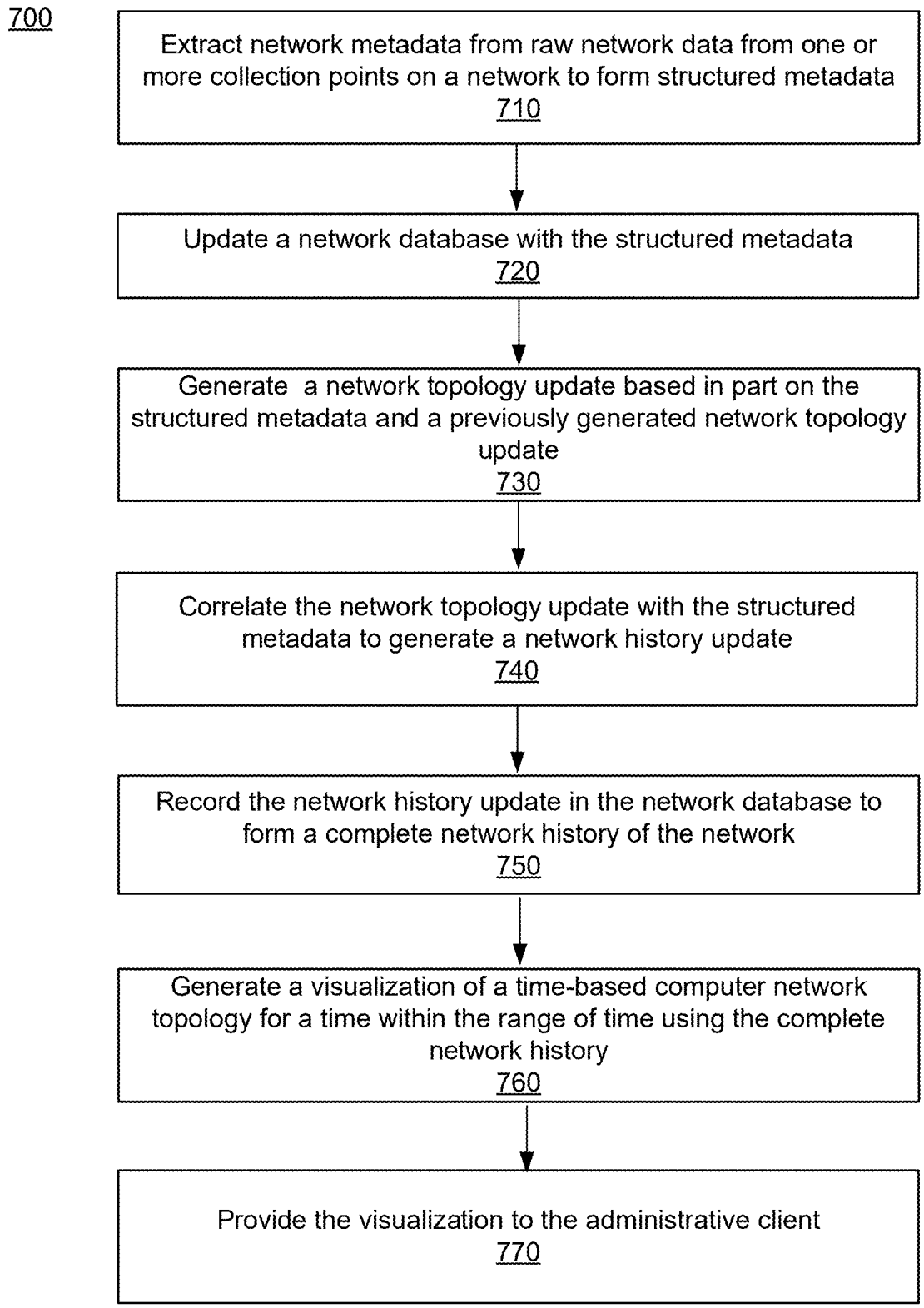
FIG. 7 is a flowchart for a method of providing a visualization based on a time-based network topology, in accordance with one more embodiments.

FIG. 7 is a flowchart for a method of a visualization based on a time-based network topology, in accordance with one or more embodiments. Alternative embodiments may include more, fewer, or different steps from those illustrated in FIG. 7, and the steps may be performed in a different order from that illustrated in FIG. 7. These steps may be performed by a security system (e.g., security system 110).

Additionally, each of these steps may be performed automatically by the security system without human intervention.

The security system extracts 710 network metadata from raw network data from one or more collection points on a network to form structured metadata. For example, the security system extracts may, e.g., obtain event and/or asset data from a data collection module (e.g., the data collection module 210) and processes (e.g., correlate, deduplicate, normalize, and deconflict the raw network data as needed) the data to generate structured metadata.

The security system updates 720 a network database (e.g., the network database 260) with the structured metadata. In some embodiments, the security system also updates the network database with the raw network data.

The security system generates 730 a network topology update based in part on the structured metadata and a previously generated network topology update. The security system retrieves from the network database structured metadata for a time period that is within the range of time. The security system may also retrieve one or more previously generated network topology updates from a graph database (e.g., the graph database 270). The security system may generate the network topology update using models (e.g., a network science model, a device inference model, and a time dependency model), the structured metadata, and the one or more previously generated network topology updates. In some embodiments, the security system updates the graph database 270 with the network topology update for the time period. The security system updates the network database 260 with the network topology update for the time period.

The security system correlates 740 the network topology update with the structured metadata to generate a network history update. The correlation functions to associate network features of the time period (which may include adjustments due to time-based inference(s)) and device information (which may include adjustments due to time-based inference(s)) for the time period with the structured metadata for that time period. Correlation may include, e.g., associating the raw network data, structured metadata, and events with their respective assets, endpoints, interfaces, and other network features.

The security system records 750 records the network history update in the network database to form a complete network history of the network. The complete network history includes network history updates for the time period as well as for any previous time periods a network history was generated. Note that while steps 710-750 are discussed in context of the first time period, as time progresses, steps 710-750 may repeat such that the complete network history for the network is continually being updated with information for subsequent time periods.

The security system generates 760 a visualization of a time-based computer network topology for a time within the range of time that includes the first time period using the complete network history. A time-based computer network topology describes topologies, events, and assets of the network over the range of time, and may be generated to show a topology of the network for a period of time within the range of time. For example, the security system may receive a request from an administrative client (e.g., the administrative client 120) to see a state of the network at a target time period. The security system may retrieve a portion of the complete network history from the network database 260 for the target time period. The security system generates the visualization of a time-based computer network topology of the network at the target time using the retrieved portion of the complete network history.

The security system provides 770 the visualization to the administrative client. An administrator may use the visualization for security monitoring, risk remediation, make changes to the time-based computer network topology, etc.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    extracting network metadata from raw network data from one or more collection points on a network to form structured metadata;
    updating a network database with the structured metadata;
    generating a network topology update associated with a first time period based in part on the structured metadata and a prior network topology update;
    correlating the network topology update with the structured metadata to generate a network history update;
    recording the network history update in the network database to form a complete network history of the network;
    generating a visualization of a time-based computer network topology for a target time within a range of time that includes the first time period using the complete network history; and
    providing the visualization to an administrative client.

2. The method of claim 1, wherein generating the network topology update associated with the first time period based in part on the structured metadata and the prior network topology update, comprises:
    determining, by applying a portion of the structured metadata to a networking science model, network features that describe how endpoint devices are connected to each other on the network over the first time period; and
    generating the network topology update based in part on the network features.

3. The method of claim 1, wherein generating the network topology update associated with the first time period based in part on the structured metadata and the prior network topology update, comprises:
    determining, by applying a portion of the structured metadata and the prior network topology update to a device inference model, device information that describes which endpoint devices are connected to the network over the first time period; and
    generating the network topology update based in part on the device information.

4. The method of claim 3, wherein the device information describes, for an endpoint device: a type of the endpoint device and a role of the endpoint device.

5. The method of claim 1, wherein generating the network topology update associated with the first time period based in part on the structured metadata and the prior network topology update, comprises:
    determining, by applying a portion of the structured metadata to a networking science model, network features that describe how endpoint devices are connected to each other on the network over the first time period;
    determining, by applying a portion of the structured metadata and the prior network topology update to a device inference model, device information that describes which endpoint devices are connected to the network over the first time period;
    determining, by applying the device information, the network features, and the prior network topology update to a time-dependency model, time-based inferences; and
    generating the network topology update based in part on the device information, the network features, and the time-based inferences.

6. The method of claim 1, wherein extracting the network metadata from the raw network data from the one or more collection points on the network to form the structured metadata, comprises:
    extracting from some or all of the raw network data: internet protocol addresses, medium access control addresses, virtual local area networks, ports, protocols, protocol attributes, timestamps, and flow direction from the raw network data.

7. The method of claim 1, wherein generating the visualization of the time-based computer network topology for the target time within the range of time that includes the first time period using the complete network history, further comprises:
    receiving a request from the administrative client to provide the visualization for the target time;
    determining a configuration for the time-based computer network topology at the target time using at least a portion of the complete network history that is associated with the target time; and
    generating the visualization based on the determined configuration.

8. A non-transitory computer readable storage medium configured to store instructions, the instructions when executed by a processor of a security system, cause the security system to:
    extract network metadata from raw network data from one or more collection points on a network to form structured metadata;
    update a network database with the structured metadata;
    generate a network topology update associated with a first time period based in part on the structured metadata and a prior network topology update;
    correlate the network topology update with the structured metadata to generate a network history update;
    record the network history update in the network database to form a complete network history for the network;
    generate a visualization of a time-based computer network topology for a target time within a range of time that includes the first time period using the complete network history; and
    provide the visualization to an administrative client.

9. The non-transitory computer readable storage medium of claim 8, where the stored instructions to generate the network topology update associated with the first time period based in part on the structured metadata and the prior network topology update further comprises stored instruction that when executed cause the security system to:
    determine, by applying a portion of the structured metadata to a networking science model, network features that describe how endpoint devices are connected to each other on the network over the first time period; and
    generate the network topology update based in part on the network features.

10. The non-transitory computer readable storage medium of claim 8, where the stored instructions to generate the network topology update associated with the first time period based in part on the structured metadata and the prior network topology update further comprises stored instruction that when executed cause the security system to:
    determine, by applying a portion of the structured metadata and the prior network topology update to a device inference model, device information that describes which endpoint devices are connected to the network over the first time period; and
    generate the network topology update based in part on the device information.

11. The non-transitory computer readable storage medium of claim 10, wherein the device information describes, for an endpoint device: a type of the endpoint device and a role of the endpoint device.

12. The non-transitory computer readable storage medium of claim 8, where the stored instructions to generate the network topology update associated with the first time period based in part on the structured metadata and the prior network topology update further comprises stored instruction that when executed cause the security system to:
   determine, by applying a portion of the structured metadata to a networking science model, network features that describe how endpoint devices are connected to each other on the network over the first time period;
   determine, by applying a portion of the structured metadata and the prior network topology update to a device inference model, device information that describes which endpoint devices are connected to the network over the first time period;
   determine, by applying the device information, the network features, and the prior network topology update to a time-dependency model, time-based inferences; and
   generate the network topology update based in part on the device information, the network features, and the time-based inferences.

13. The non-transitory computer readable storage medium of claim 8, where the stored instructions to extract the network metadata from the raw network data from the one or more collection points on the network to form the structured metadata further comprises stored instruction that when executed cause the security system to:
   extract from some or all of the raw network data: internet protocol addresses, medium access control addresses, virtual local area networks, ports, protocols, protocol attributes, and flow direction from the raw network data.

14. The non-transitory computer readable storage medium of claim 8, where the stored instructions to generate the visualization of the time-based computer network topology for the target time within the range of time that includes the first time period using the complete network history further comprises stored instruction that when executed cause the security system to:
   receive a request from the administrative client to provide a visualization for the target time;
   determine a configuration for the time-based computer network topology at the target time using at least a portion of the complete network history that is associated with the target time; and
   generate the visualization based on the determined configuration.

15. A security system comprising:
a processor; and
a non-transitory computer readable storage medium configured to store instructions that, when executed by the processor, cause the security system to:
   extract network metadata from raw network data from one or more collection points on a network to form structured metadata,
   update a network database with the structured metadata,
   generate a network topology update associated with a first time period based in part on the structured metadata and a prior network topology update,
   correlate the network topology update with the structured metadata to generate a network history update,
   record the network history update in the network database to form a complete network history for the network,
   generate a visualization of a time-based computer network topology for a target time within a range of time that includes the first time period using the complete network history, and
   provide the visualization to an administrative client.

16. The system of claim 15, where the stored instructions to generate the network topology update associated with the first time period based in part on the structured metadata and the prior network topology update further comprises stored instruction that when executed cause the security system to:
   determine, by applying a portion of the structured metadata to a networking science model, network features that describe how endpoint devices are connected to each other on the network over the first time period; and
   generate the network topology update based in part on the network features.

17. The system of claim 15, where the stored instructions to generate the network topology update associated with the first time period based in part on the structured metadata and the prior network topology update further comprises stored instruction that when executed cause the security system to:
   determine, by applying a portion of the structured metadata and the prior network topology update to a device inference model, device information that describes which endpoint devices are connected to the network over the first time period; and
   generate the network topology update based in part on the device information.

18. The system of claim 15, where the stored instructions to generate the network topology update associated with the first time period based in part on the structured metadata and the prior network topology update further comprises stored instruction that when executed cause the security system to:
   determine, by applying a portion of the structured metadata to a networking science model, network features that describe how endpoint devices are connected to each other on the network over the first time period;
   determine, by applying a portion of the structured metadata and the prior network topology update to a device inference model, device information that describes which endpoint devices are connected to the network over the first time period;
   determine, by applying the device information, the network features, and the prior network topology update to a time-dependency model, time-based inferences; and
   generate the network topology update based in part on the device information, the network features, and the time-based inferences.

19. The system of claim 15, where the stored instructions to extract the network metadata from the raw network data from the one or more collection points on the network to form the structured metadata further comprises stored instruction that when executed cause the security system to:
   extract from some or all of the raw network data: internet protocol addresses, medium access control addresses, virtual local area networks, ports, protocols, protocol attributes, and flow direction from the raw network data.

20. The system of claim 15, where the stored instructions to generate the visualization of the time-based computer network topology for the target time within the range of time that includes the first time period using the time-based computer network topology of the network further comprises stored instruction that when executed cause the security system to:
- receive a request from the administrative client to provide a visualization for the target time;
- determine a configuration for the time-based computer network topology at the target time using at least a portion of the complete network history that is associated with the target time; and
- generate the visualization based on the determined configuration.

* * * * *